United States Patent [19]

Wohlrab

[11] Patent Number: 5,302,108

[45] Date of Patent: Apr. 12, 1994

[54] MOLD CLOSING APPARATUS FOR AN INJECTION MOLDING MACHINE

[75] Inventor: Walter Wohlrab, Weissenburg, Fed. Rep. of Germany

[73] Assignee: Krauss Maffei Aktiengesellschaft, Fed. Rep. of Germany

[21] Appl. No.: 14,026

[22] Filed: Feb. 5, 1993

Related U.S. Application Data

[60] Division of Ser. No. 727,351, Jul. 8, 1991, Pat. No. 5,204,047, which is a continuation of Ser. No. 421,307, Oct. 13, 1989, abandoned, which is a continuation of Ser. No. 115,053, Oct. 30, 1987, abandoned.

[30] Foreign Application Priority Data

Oct. 31, 1986 [DE] Fed. Rep. of Germany ....... 3637175

[51] Int. Cl.$^5$ .................................. B29C 45/68
[52] U.S. Cl. ............................. 425/589; 425/590; 425/595; 425/450.1; 425/451.9
[58] Field of Search ............... 425/589, 590, 594, 595, 425/450.1, 451.2, 451.9; 264/328.1

[56] References Cited

U.S. PATENT DOCUMENTS

| | | |
|---|---|---|
| 2,396,539 | 3/1946 | Smith et al. |
| 2,689,978 | 9/1954 | Roger ................................ 425/451.2 |
| 3,156,014 | 11/1964 | Wenger .............................. 425/595 |
| 3,263,277 | 8/1966 | Ohlendorf et al. ................ 425/451.2 |
| 3,456,297 | 7/1969 | Andreasson ...................... 425/451.2 |
| 3,590,440 | 7/1971 | Cook, Jr. |
| 3,716,323 | 2/1973 | Classen ............................. 425/451.2 |
| 4,017,236 | 4/1977 | Penkman et al. |
| 4,571,169 | 2/1986 | Shima et al. ...................... 425/589 |

FOREIGN PATENT DOCUMENTS

| | | |
|---|---|---|
| 1214393 | 4/1966 | Fed. Rep. of Germany . |
| 1729143 | 3/1972 | Fed. Rep. of Germany . |
| 1805938 | 7/1973 | Fed. Rep. of Germany . |
| 3103718 | 9/1982 | Fed. Rep. of Germany ...... 425/590 |
| 3446507 | 7/1985 | Fed. Rep. of Germany . |
| 51-71356 | 6/1976 | Japan ................................... 425/595 |

OTHER PUBLICATIONS

Der Aufbau von Schliess-und Spritzeinheit: "Bewaehrte Systeme fuer die Zukunft" Ing. (grad.) H. Laberer, Konstruktion Mechanik (no translation).

Primary Examiner—Jay H. Woo
Assistant Examiner—James P. Mackey
Attorney, Agent, or Firm—Robert J. Koch

[57] ABSTRACT

A mold closing apparatus and process for use with an injection molding machine are described. The mold is opened and closed by hydraulic pressure. The disclosed apparatus and method relate to the use of an immobile differential piston within a displaceable, double-action differential piston which moves within an immobile piston cylinder. This arrangement permits the use of smaller diameters to produce the necessary closing force. The immobile differential piston contains the necessary hydraulic passage for routing hydraulic fluid to the appropriate surfaces for exerting opening and closing forces. The use of a plurality of displaceable, single-acting pistons in parallel with the differential piston further reduces the diameters needed for exerting the claim force. Locating these single-acting pistons within the support column cylinders makes for an ever more compact apparatus.

19 Claims, 3 Drawing Sheets

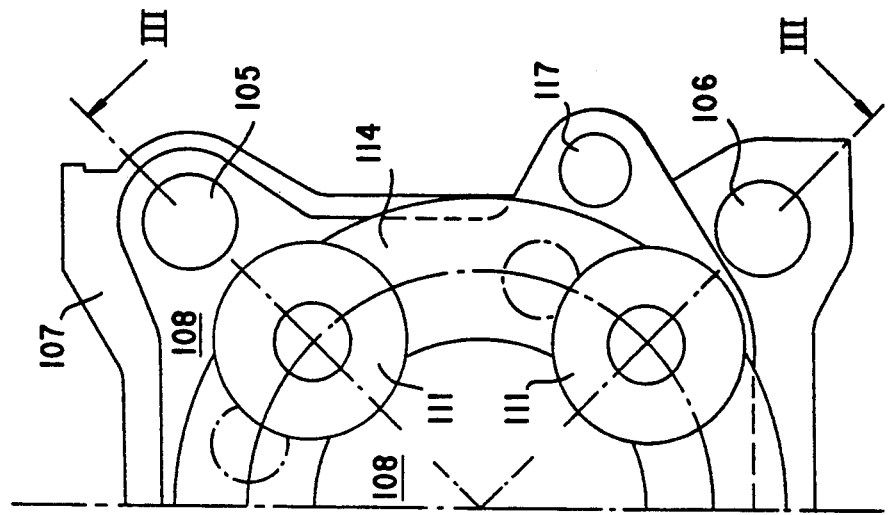
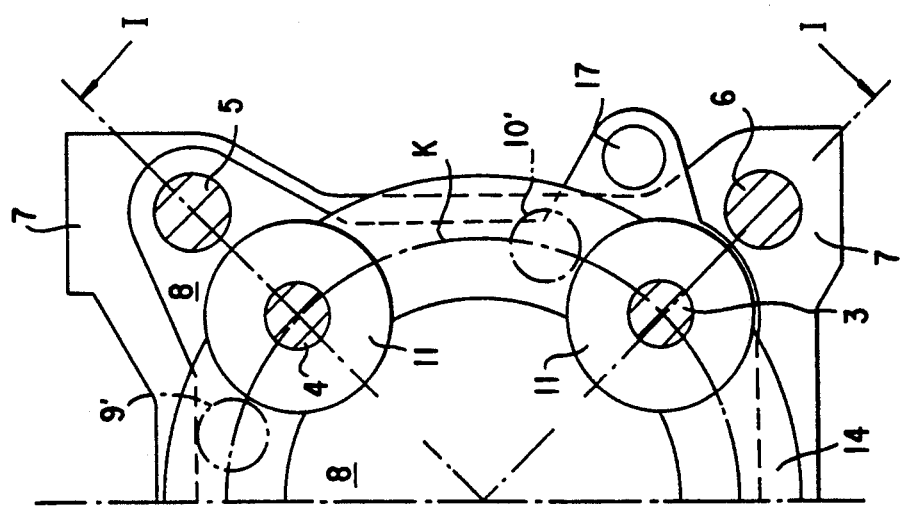

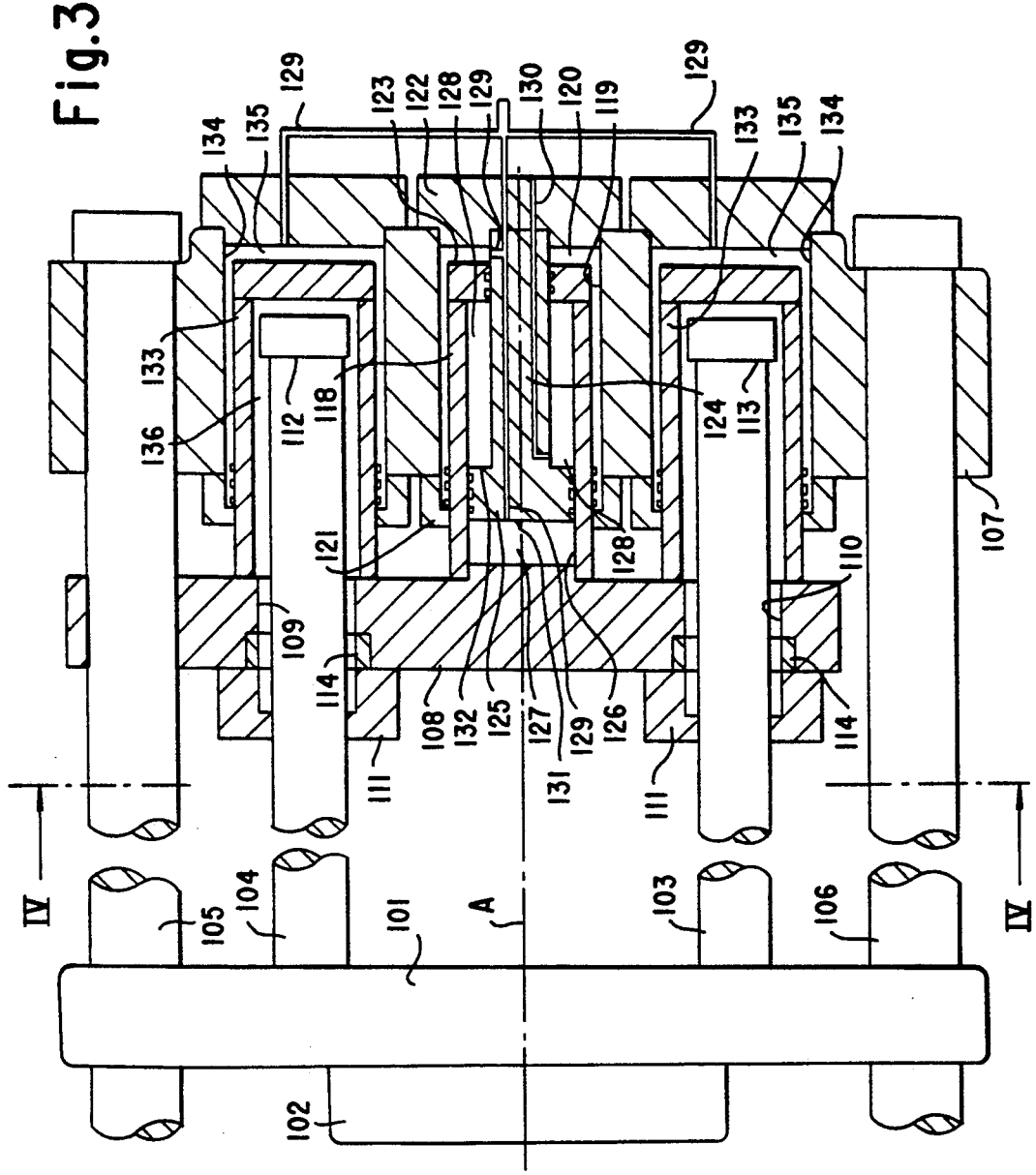

MOLD CLOSING APPARATUS FOR AN INJECTION MOLDING MACHINE

CROSS REFERENCE TO RELATED APPLICATIONS

This application is a divisional of application Ser. No. 07/727,351 filed Jul. 8, 1991, now U.S. Pat. No. 5,204,047, which is a continuation of earlier application Ser. No. 07/421,307 filed Oct. 13, 1989, now abandoned, which, in turn, is a continuation of earlier application Ser. No. 07/115,053 filed Oct. 30, 1987, also now abandoned.

The invention relates to a mold closing apparatus for an injection molding machine.

DESCRIPTION OF RELATED TECHNOLOGY

Injection molding machines having stationary and mobile mold platens have the disadvantage that they comprise very large structural parts which are expensive to manufacture and difficult to seal. One example of such a structural part is seen in the prospectus "Krauss-Maffei Journal Kunststoffmaschinen" No. 8/1979. On page 14, FIG. 2 a closing piston is shown and is sized to correspond to the applied closing pressure. This results in large diameters for the closing piston particularly in machines with closing forces over 8000 kn.

SUMMARY OF THE INVENTION

It is therefore one objective of the invention to provide a mold closing apparatus comprising structural parts that are simpler to make and easier to seal.

This objective is attained by use of a mold closing apparatus comprising at least one opening/closing cylinder which comprises an immobile differential piston within a displaceable, double-acting differential piston which is within an immobile piston cylinder. The displaceable piston exerts force on a lock plate which transfers that force to a mobile mold platen. The immobile components are attached to a support.

Because of the double-acting differential piston, a smaller piston diameter is sufficient to produce the necessary closing force. Smaller diameters translate into pistons which may be produced with greater precision and improved surface qualities. These properties lead to reduced wear of the piston's friction surfaces and of the sealing gaskets to those surfaces.

The application of this invention eliminates the need for precision working of the cylinder bores in the support. Machining these bores is significantly more expensive than milling the cylindrical inner and outer surfaces of the double-acting differential piston.

Furthermore, this invention facilitates the installation and maintenance of sealing gaskets.

In a preferred embodiment, the support comprises several support columns spaced apart and parallel to the principal axis of the injection molding machine (the injection axis). The attachment pattern may be a circular layout on the mobile mold platen. This results in better support of the mobile mold platen due to the more even distribution of the support forces over the mobile mold platen. A circular layout also permits the mobile mold platen to be free of support elements in its center and intermediate area. The ejection system may be located in that area.

Preferably, four displaceable, single-acting pistons communicate with the lock plate and are guided by piston cylinders in the supports. These single-acting pistons do not contain differential pistons and serve to produce additional closing force. By distributing the closing function over several displaceable, single-acting pistons, the centrally-mounted, differential piston diameter may be even smaller. This permits a more compact configuration because more structural parts may be arranged at smaller radial distances from the differential cylinder. In order to obtain a more compact configuration, the displaceable, single-acting pistons may be axially aligned with the support columns and contain cavities sized to receive the support columns. During mold opening the support columns are moved with the mold platen and enter the cavities. The overall length is, thus, shortened advantageously.

The displaceable, single-acting pistons and the double-acting differential pistons preferably have dimensions and/or diameters to result in a plurality of smaller, structurally similar parts. The use of the same outer diameter permits manufacture with identical cylinder bores for all single-acting pistons and double-acting differential pistons. This also allows the use of the same gasket size for all pistons with the exception for the immobile differential piston gaskets.

The smaller diameters have higher gasket efficiencies. This is an advantage not found in previous configurations which use larger pistons.

The use of the instant immobile differential piston results in large hydraulic surfaces in the double-acting differential cylinder chamber for mold opening. High mold opening forces are made possible as a result.

BRIEF DESCRIPTION OF THE DRAWINGS

The invention will become more apparent from the following examples of embodiment.

In the drawings:

FIG. 2 illustrates the mold closing device in a view according to the section line II—II in FIG. 1;

FIG. 3 is a further embodiment of the mold closing apparatus in a view according to the section line III—III in FIG. 4 and FIG. 4 depicts the mold closing apparatus according to the section line IV—IV in FIG. 3.

DETAILED DESCRIPTION OF THE DRAWINGS

Figure 1:
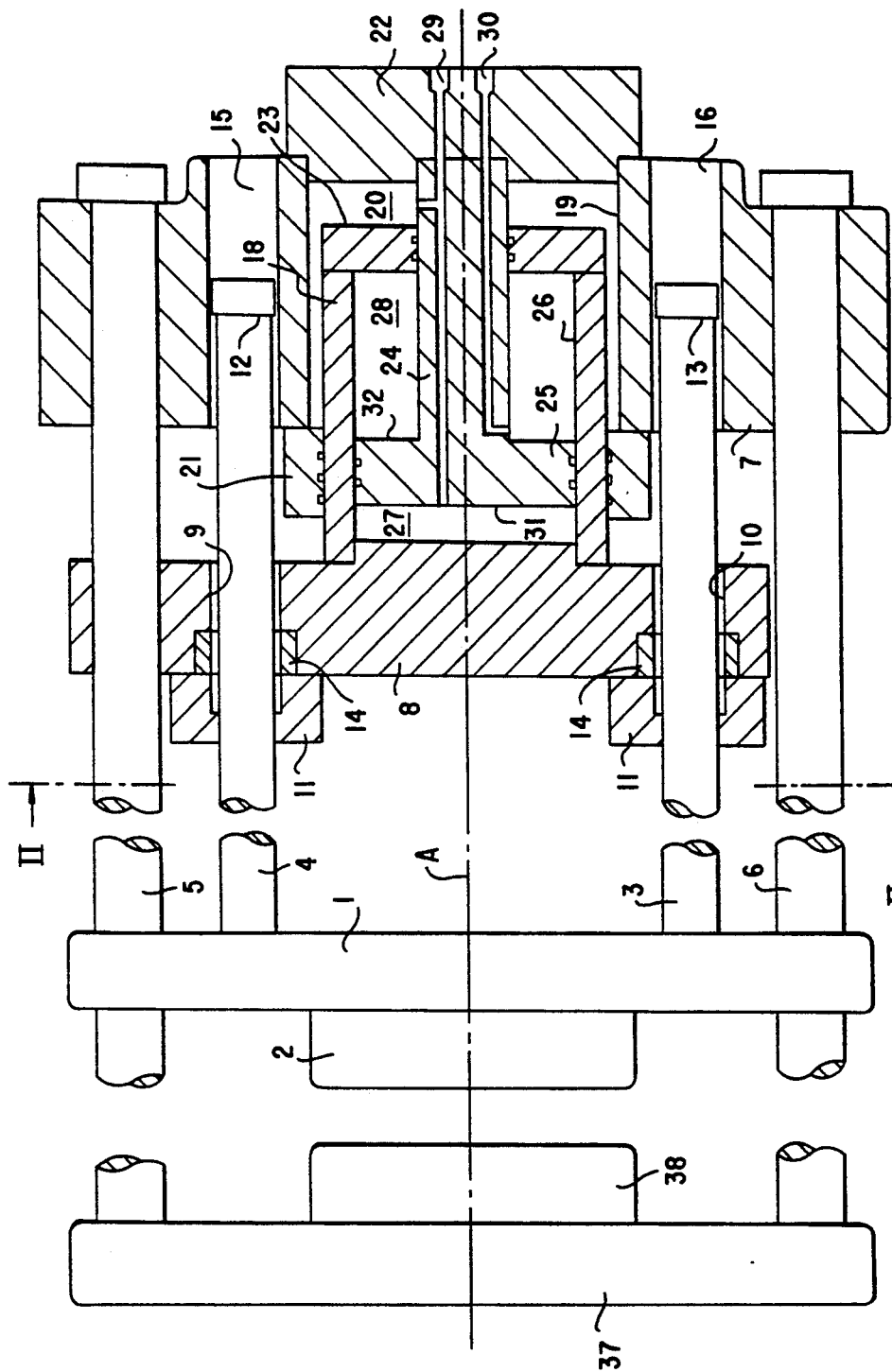
FIG. 1 shows a mold closing apparatus of an injection molding machine in a view according to the section line I—I in FIG. 2.

FIGS. 1 and 2 show a mold closing apparatus of an injection molding machine with a mobile mold platen 1. Mold half 2 is mounted on platen 1 in addition to attached support columns 3 and 4. Mold platen 1 is displaceably supported in guide columns 5 and 6 which are fixedly anchored in support 7. Mold half 38 is mounted on stationary mold platen 37 fixedly connected by guide columns 5 and 6 to a support.

On the guide column is a displaceably supported means for locking support columns 3 and 4 into uniform displacement. Such a means is exemplified by lock plate 8. Lock plate 8 comprises openings 9 and 10 through which pass support columns 3 and 4. Plate 8 also has a securing means for fastening plate 8 to those columns. Locking sleeve elements 11 are set onto the openings 9 and 10, in which the ends of the support columns 3 and 4 equipped with stop rims 12 and 13, may lock by rotating a locking disk 14. This assembly is a securing means according to this invention.

Passage bores 15 and 16 are aligned with columns 3 and 4 through support 7. In the opening phase, these bores make possible the free passage of the support columns.

The mobile mold platen 1 may be displaced by displacement means such as rapid acting hydraulic cylinders 17. These cylinders are supported on lock plate 8.

A displaceable double-acting differential piston 18 is mounted on lock plate 8. Preferably, this piston is in the center of plate 8 and along the principal axis A of the injection molding machine. This double-acting piston 18 is guided in an immobile differential cylinder 19 in support 7. Main cylinder chamber 20 is enclosed by the immobile piston cylinder is closed off on one side by gasket-containing guide ring 21 fastened to support 7. On the other side is cover 22 fastened to the support. The displaceable double-acting differential piston surface 23 facing away from lock plate 8 is traversed by piston rod 24 of an immobile differential piston 25. Piston 25 is fixedly connected with support 7. Piston rod 24 is guided in a differential cylinder 26 provided in displaceable double-acting differential piston 18.

Immobile differential piston 25 divides differential cylinder 26 into a chamber 27 on the opening side and chamber 28 on the closing side. By means of pressure line 29, chambers 20 and 27 may be filled and exposed to hydraulic pressure to close the mold. These chambers may also be emptied by line 29 during mold opening. Chamber 28 is filled and pressured through line 30 for opening the mold and emptied by line 30 for mold closing. For mold closing, pressure acts on surfaces 23 and 31. Mold opening uses surface 32.

In view of the enlarged piston surface (23 and 31) available for closing the mold, the diameter of the double-acting differential piston 18 may be maintained small enough to locate other functional elements between piston 18 and guide columns 5 and 6. For example, columns 3 and 4 may be arranged in that space as shown. Arranging columns 3 and 4 for efficient space (use such as parallel to the principal axis A and distributed on the circle K on mobile mold platen 1) offers the advantages of more widely distributed support and free space in the central area of mobile mold platen 1. These conditions are favorable for locating an ejection system in the central space.

For the mold closing process, mobile mold platen 1 is moved by displacement means such as independent, rapid-action, hydraulic cylinders 17 into the closed position. The ends of support columns 3 and 4 become locked in locking sleeve elements 11. Openings 9 and 10 in lock plate 8 are closed by moving disk 14 to locking position. The locking position of lock disk 14 is indicated in FIG. 2 by the dash-and-dot circles 9' and 10'. Closing pressure line 29 is exposed to pressure thereby accumulating the desired closing force against double-acting piston surface 23 and immobile differential piston surface 31 and transferring it via support columns 3 and 4 to mobile mold platen 1. The pressure in differential cylinder chamber 28 is removed by opening line 30 to a reservoir tank (not shown).

For mold opening, surface 32 is exposed to pressure from line 30. Line 29 is opened to the reservoir for removing pressure from surfaces 23 and 31. The opening force is transferred from surface 32 to the mold by the displacement of piston 18 relative to surface 32. Piston 18 moves plate 8 which holds rims 12 and 13 of columns 3 and 4 in locking sleeves 11. Mold platen moves as columns 3 and 4 are displaced.

To open the mold closing apparatus, lock disk 14 rotates to free openings 9 and 10 in the lock plate 8. Then, mobile mold plate 1 is moved by displacement means such as rapid action hydraulic cylinders 17 into the open position thereby moving columns 3 and 4 into passage bores 15 and 16 in support 7 as shown in FIG. 1.

The mold closing apparatus shown in FIGS. 3 and 4 corresponds in parts 101 to 114 and 117 to the parts 1 to 7 and 17 of the embodiment according to FIGS. 1 and 2. Additionally, the following components elements in FIGS. 1 and 2 correspond to displaceable double-acting differential piston 118 centered on lock plate 108, together with immobile piston cylinder 119, main cylinder 120, guide ring 121, cover 122, differential piston surface 123, piston rod 124, immobile differential piston 125, displaceable double-acting differential cylinder 126, differential cylinder chamber 127 on the closing side, differential cylinder chamber 128 on the opening side, pressure line 129, pressure line 130, differential piston surface 131 and differential piston counter surface 132. These elements relate to the structural configuration and the functioning of parts 18 to 31 as shown in FIGS. 1 and 2.

However, the embodiment shown in FIGS. 3 and 4 would use an immobile differential piston 118 of a smaller diameter than that shown in FIGS. 1 and 2. The difference is because the required closing force is generated by additional displaceable, single-acting pistons 133 of simple operation. Pistons 133 are located on lock plate 108 and are disposed in plunger cylinders 134 located in support 107. The secondary cylinder chambers 135 enclosed by plunger cylinders 134 are located in a spaced apart manner and parallel to the immobile piston cylinder 119. They are connected parallel with main cylinder 120 and differential cylinder chamber 127 by pressure line 129 which introduces hydraulic fluid for closing the mold. Displaceable, single-acting pistons 133 are aligned with the support columns 103 and 104 and contain cavities 136 into which support columns 103 and 104 enter during closing sequence.

Because the closing force is distributed over a plurality of displaceable pistons 133 and double-acting differential piston 118, pistons with small piston diameters are sufficient. These pistons are significantly less expensive than larger pistons and may be produced with higher precision and surface quality. This smaller diameter also improves the performance of the sealing gaskets.

I claim:

1. A mold closing apparatus useful for injection molding machines, said apparatus comprising:
   - a stationary mold platen fixedly connected by guide columns to a support;
   - a mobile mold platen supported on said guide columns and including support columns, each of said support columns having a stop rim located at an end of said support column;
   - a lock plate defining passages configured so said stop rims of said support columns pass through said passages and including stop rim securing elements for securing said stop rims to said lock plate; and
   - at least one closing cylinder configured so said mobile mold platen is displaced toward and against said stationary mold platen to close a mold disposed between said stationary mold platen and said mobile mold platen, and said mobile mold platen is displaced away from said stationary mold platen to open said mold, said closing cylinder comprising at least:
  an immobile piston cylinder attached to a second support;
  a displaceable double-acting differential piston at least partially within and guided by said immobile piston cylinder during displacement; and
  an immobile differential piston within said double-acting differential piston and attached to said second support;
  wherein said immobile differential piston divides interior space within said double-acting differential piston into a mold-opening chamber having mold-opening pressure surfaces and a mold-closing chamber having mold-closing pressure surfaces, said pressure surfaces are configured so said mobile mold platen is displaced when pressure is applied to said pressure surfaces.

2. An apparatus as in claim 1, wherein said immobile differential piston has at least one passageway communicating with at least one of said chambers.

3. An apparatus as in claim 1, wherein said lock plate is configured so said support columns are locked for uniform displacement, when said mobile mold platen is displaced.

4. An apparatus as in claim 1, wherein at least one of said stop rim securing elements comprises:
  a sleeve aligned with one of said passages and
  a locking disk configured so one of said stop rims on one of said support columns is locked to said lock plate, when said one of said stop rims is within said sleeve, and having a uniform surface for exerting pressure on said one of said support columns.

5. An apparatus as in claim 1, wherein each of said immobile differential piston and said displaceable double-acting differential piston includes an axis coinciding with an injection axis in an injection molding machine.

6. An apparatus as in claim 1, wherein said support columns are uniformly spaced and attached to said mobile mold platen, and an axis of said at least one closing cylinder is substantially parallel to axis of said support columns.

7. An apparatus as in claim 6, further comprising at least one displaceable single-acting piston within a plunger cylinder attached to said second support.

8. An apparatus as in claim 7, wherein said at least one displaceable, single-acting piston is coaxial with one of said support columns and has a cavity configured to receive said one of said support columns during movement of said mobile mold platen.

9. An apparatus as in claim 7, wherein a diameter of said displaceable double-acting piston is substantially equal to a diameter of said at least one displaceable, single-acting piston.

10. An apparatus as in claim 6, wherein said plurality of support columns is attached to said mobile mold platen in a circular pattern.

11. An apparatus as in claim 6, wherein said support columns comprise four support columns.

12. An apparatus according to claim 1, wherein said mold-closing chamber defined in part by interior surfaces of said double-acting differential piston is a first mold closing chamber, said apparatus further comprising a second mold-closing chamber defined in part by an exterior surface of said double-acting differential piston.

13. A mold closing apparatus comprising:
  a stationary mold platen fixedly connected by guide columns to a support;
  a mobile mold platen supported on said guide columns and including support columns, each of said support columns having a stop rim located at an end of said support column;
  a lock plate defining passages configured so said stop rims of said support columns pass through said passages and including stop rim securing elements for securing said stop rims to said lock plate; and
  at least one closing cylinder configured so said mobile mold platen is displaced toward and against said stationary mold platen to close a mold disposed between said stationary mold platen and said mobile mold platen, and said mobile mold platen is displaced away from said stationary mold platen to open said mold, said closing cylinder comprising at least:
    an immobile piston cylinder attached to a second support;
    a displaceable double-acting differential piston at least partially within and guided by said immobile piston cylinder during displacement; and
    an immobile differential piston within said double-acting differential piston and attached to said second support;
    wherein said immobile differential piston divides interior space within said double-acting differential piston into at least a mold-opening chamber having mold-opening pressure surfaces; an exterior surface of said double-acting differential piston defining in part a mold-closing chamber having mold-closing pressure surfaces, and pressure surfaces are configured so said mobile mold platen is displaced when pressure is applied to said pressure surfaces.

14. An apparatus according to claim 13, wherein said immobile differential piston further divides interior space within said double-acting differential piston into an additional mold-closing chamber.

15. An apparatus according to claim 14, wherein said immobile differential piston has a passageway in fluid communication with each of said mold-closing chambers.

16. An apparatus as in claim 13, wherein at least one of said stop rim securing elements comprises:
  a sleeve aligned with one of said passages, and
  a locking disk configured so one of said stop rims is locked to said lock plate, when said one of said stop rims is within said sleeve.

17. An apparatus according to claim 13, wherein each of said immobile differential piston and said displaceable double-acting differential piston includes an axis coinciding with an injection axis in an injection molding machine.

18. An apparatus according to claim 13, further comprising at least one displaceable single-acting piston within a plunger cylinder attached to said second support.

19. An apparatus according to claim 18, wherein said at least one displaceable, single-acting piston is coaxial with one of said support columns and has a cavity configured to receive said one of said support columns during movement of said mobile mold platen.

* * * * *